US005421869A

United States Patent [19]

Gundjian et al.

[11] Patent Number: 5,421,869

[45] Date of Patent: Jun. 6, 1995

[54] SECURITY MARKING METHOD AND COMPOSITION

[75] Inventors: Arshavir Gundjian, Montreal; Abraham Kuruvilla, Quebec, both of Canada

[73] Assignee: Nocopi Technologies, Inc., Wayne, Pa.

[21] Appl. No.: 69,238

[22] Filed: May 28, 1993

[51] Int. Cl.[6] .......... C09D 11/00; B41M 3/14

[52] U.S. Cl. .......... 106/21 R; 106/21 A; 106/22 B; 427/7; 427/145; 427/157

[58] Field of Search .......... 106/21 R, 21 A, 22 B; 427/7, 145, 157

[56] References Cited

U.S. PATENT DOCUMENTS

| | | | |
|---|---|---|---|
| 3,886,083 | 5/1975 | Laxer | 106/21 A |
| 4,015,131 | 3/1977 | McDonough et al. | 106/21 A |
| 4,186,020 | 1/1980 | Wachtel | 106/21 A |
| 4,188,431 | 2/1980 | Sokol et al. | 106/21 A |
| 4,205,865 | 6/1980 | Lange et al. | 106/21 A |
| 4,243,694 | 1/1981 | Mansukhani | 106/21 A |
| 4,322,466 | 3/1982 | Tomlinson | 106/21 A |
| 4,610,806 | 9/1986 | Rosen | 106/21 A |
| 4,629,630 | 12/1986 | Deyrient | 427/157 |
| 4,631,203 | 12/1986 | Schaefer et al. | 106/21 A |
| 5,135,569 | 8/1992 | Mathias | 106/22 B |

*Primary Examiner*—Helene Klemanski
*Attorney, Agent, or Firm*—Sprung Horn Kramer & Woods

[57] ABSTRACT

A security marking method comprises marking a portion of the substrate by applying a first marking fluid which is invisible to a unaided eye when illuminated by both visible light and ultraviolet light and activating the marked portion by applying a second marking fluid thereon. The second marking fluid is reactable with the first marking fluid to be invisible to an unaided human eye when illuminated by visible light and fluorescent when illuminated by ultraviolet light. The invention also includes the composition comprising the first and second marking fluids.

16 Claims, 1 Drawing Sheet

SECURITY MARKING METHOD AND COMPOSITION

BACKGROUND OF THE INVENTION

The present invention relates to a method and a composition for identifying diverse products that can be made of diverse materials, such as paper documents, appliances, clothing, boxes, glass products, plastic finish products and others in a covert manner.

It is, of course, well known that various means have been proposed in the past for covertly marking and identifying items. The previously used identifying methods utilized essentially the so-called ultraviolet inks or paints that fluoresce when subjected to an ultraviolet light source. Such simple fluorescent markings used in conjunction with ultraviolet lights provide of course a dramatic effect, since the marking, which is originally seemingly invisible in visible or normal light, becomes brightly florescent under ultraviolet radiation. However, the fundamental drawback of such systems is that they are by their nature readily visible upon illumination by ultraviolet radiation and, therefore, can be easily located by any counterfeiter or product diverter. Consequently, such marks can be removed or they can be altered, since fluorescent dyes known as optical brighteners and inks are readily available today on the market.

SUMMARY OF THE INVENTION

The object of the present invention is to provide a dramatically effective solution to the above-mentioned problem by keeping the covert marking invisible both under regular (visible) light and under ultraviolet illumination. Thus, only the originator of the marking knows its location, and, therefore, to erase or modify such a covert mark by an uninformed intruder is practically impossible without destroying the entire substrate that carries the marking.

The present invention is based upon the use of a reactive marking composition A which is normally invisible both to the naked eye under normal or visible lighting conditions and when viewed under ultraviolet radiation. This marking composition A is, however, reactive with another composition B in such a manner that upon interaction with composition B, the original marking continues to remain practically invisible to the naked eye under normal lighting conditions, while on the other hand it becomes brilliant by fluorescence when subjected to any one of the commonly used sources of ultraviolet radiation.

Since this covert marking reveals itself only following both the activation process and the provision of ultraviolet illumination, the method of the present invention is qualified as a double security, fluorescence on demand, marking system.

Indeed the first and high level of security is provided by the invisibility of the marking to the naked eye both under normal lighting and ultraviolet illumination conditions. The second level of security which plays the role of a double lock is provided by the fact that the mark must be activated with a special marker and the marking still remains practically invisible to the naked eye and reveals itself only in the form of a switched on fluorescence which shows only upon illumination by a commonly available ultraviolet radiation source.

It is significant that the present invention lends itself perfectly well to applications where a dark colored or even pitch black substrate is involved, since the fluorescent behavior renders the mark perfectly visible against the dark or black background.

In accordance with the present invention, the method comprises the steps of marking a portion of a substrate by applying a first marking fluid, which upon drying is invisible to the human eye both when illuminated by visible light and with ultraviolet light. The marked portion is activated by applying a second marking fluid thereon, wherein the second marking fluid is reactable with the first marking fluid to be invisible upon drying to an unaided human eye when illuminated by visible light but it fluoresces when illuminated by ultraviolet light and thereby becomes visible.

The first marking fluid is preferably selected from amino phthalides and quinazolines, with the second marking fluid selected from novalac resins, bisphenols and hydroxybenzoates.

Alternatively, the first marking fluid is selected from novalac resins, bisphenols and hydroxybenzoates, and the second marking fluid is selected from amino phthalides and quinazolines.

In one embodiment, the first and second marking fluids are each applied in solvent vehicles, preferably selected from alcohol, acetone, methylethylketone or a combination thereof.

In an alternative embodiment, the first and second marking fluids are applied as micronized particles in an aqueous solution with a binder. The activation step further comprises applying a solvent to the applied first and second marking fluids on the substrate.

The present invention also relates to a security marking composition which comprises the first and second marking fluids as set forth above.

These and other features and advantages of the present invention will become more apparent from the detailed description of the present invention taken with the attached drawings, wherein:

DETAILED DESCRIPTION OF THE INVENTION

The system of the present invention begins with the concept of applying, to a surface, a colorless marking fluid containing the composition A using a vehicle which upon drying leaves no visible trace on the applied surface. It has been discovered that a choice from the well known solvents such as alcohol, acetone, methylethylketone, etc. can easily be made to act as a vehicle for composition A with regard to a substrate, such that after drying practically no visible trace is left on the surface. Furthermore, as described above, the molecular structure of composition A is such that it is practically non-interactive to radiation at least down to the usual shortwave ultraviolet wavelength range of one to two hundred nanometers and preferably even below such wavelengths.

Figure 1:
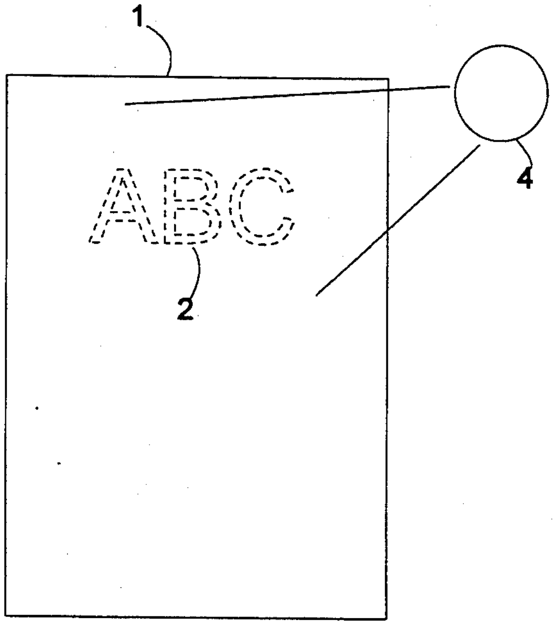
FIG. 1 is a schematic view of the first step of the method according to the present invention.
Figure 2:
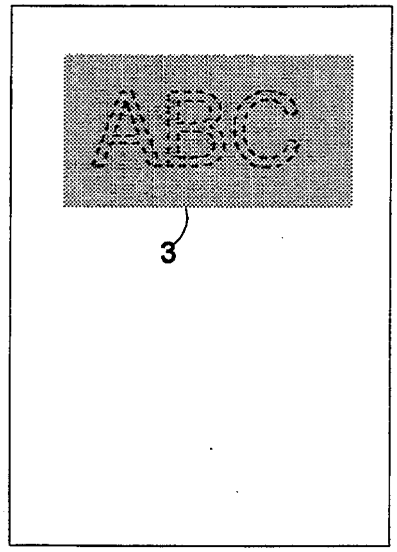
FIG. 2 is a schematic representation of the second step of the method according to the present invention.
Figure 3:
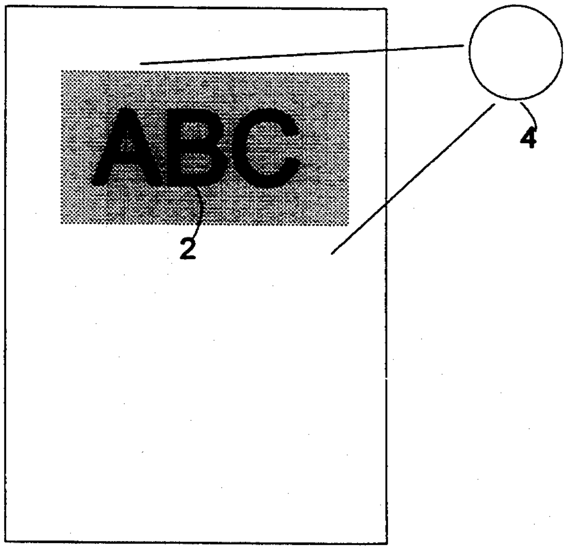
FIG. 3 is a schematic representation of a third step in accordance with the method of the present invention.

FIG. 1 shows the first step in the method wherein the marking 2 is applied to a substrate 1. The marking 2 is invisible both under normal lighting conditions (visible light) and when illuminated by an ultraviolet light source 4. The substrate can be from a diverse range of materials, including paper, cardboard, plastic, metals, fabrics, plastics, glass, etc. When a composition B is carried by a solvent such as alcohol, acetone, methylethylketone, etc., and is applied over the same area 3 where the marking A has been applied as is shown in FIG. 2, compositions A and B react and the molecular structure of composition A is modified in such a way that the new modified molecule exhibits a pronounced, fluorescence effect. Specifically, the electronic structure of the new molecule exhibits a strong absorption at ultraviolet frequencies in the range of one hundred to four hundred nanometer wavelengths and correspondingly exhibits a strong fluorescence emission in the visible spectrum, as shown in FIG. 3 when illuminated by an ultraviolet light source 4. Such emissions, being relatively monochromatic and appearing as a blue, yellow, red or orange color, will be visible even on a pitch black substrate. The new molecule when not excited by the ultraviolet radiation from source 4, does not exhibit any appreciable absorption or emission in the visible spectrum and thus remains invisible.

In accordance with the present invention, it has been found that amino phthalides and quinazolines can be used as composition A in solvent vehicles such as alcohol, acetone and methylethylketone or any combination thereof. In one embodiment, highly micronized particles of composition A can be carried by an aqueous solution and be applied with a binder to a given surface or substrate. It has been found that materials such as novalac resins, bisphenols and hydroxybenzoates can be used as composition B in solvent vehicles such as alcohol, acetone and methylethylketone or any combination thereof. In an alternative embodiment, the composition B can also be highly micronized and carried by an aqueous solution. When compositions A and B are applied through a solvent, the two molecules react instantly and the mechanism described above makes the marking visible under ultraviolet radiation. When compositions A and B include the micronized particles and are applied through and aqueous vehicle, the activation will take place only after highlighting the combination of compositions A and B with a solvent such as alcohol, acetone methylethylketone, etc. Activation in this case can also be achieved by heating the combination up to a temperature in the range of around 65° to 100° C.

When the method and composition according to the present invention is applied to specific substrates, it is important to take into consideration the material, finish and color of the substrate in order to insure a high level of naked eye invisibility. In particular, the vehicle carrying composition A must be essentially clear, and it should not aggressively attack the substrate surface, and its own interaction with ultraviolet light must match that of the substrate. Thus if the substrate tends to absorb ultraviolet light, the vehicle for A must do the same and on the contrary if the substrate tends to show fluorescence then the vehicle for A should do the same. This latter feature can easily be achieved by the addition of minute percentages of optical absorbers or optical brighteners to the vehicle of A as the need dictates.

The following are examples of compositions usable as chemicals A and B:

Chemical A:

3,3-Bis (4-Dimethylaminophenyl)-6-dimethylaminophthalide (CVL) (molecular formula $C_{26}H_{29}N_3O_2$)

3-(4-Dimethylaminophenyl)-3-[n,N-Bis(4-Octylphenyl)-amino] phthalide. (molecular formula $C_{44}H_{56}N_2O_2$)

Quinazoline Dye

Chemical B:

Benzyl 4-Hydroxybenzoate (molecular formula $C_{14}H_{12}O_3$)

4,4-Isopropylidenediphenol Novalac resin-modified alkylphenol polymer (molecular formula $(CH_3)_2C(C_6H_4OH)_2$)

EXAMPLE

An amino phthalide $C_{44}H_{56}O_2$ or 3-(4-Dimithylaminophenyl)-3-[n,N-Bis(4-Octylphenylamino] phthalide was used as chemical A and was dissolved in normal propyl alcohol or in methylethylketone. Benzyl 4-hydroxybenzoate ($C_{14}H_{12}O_3$) was used as chemical B and was dissolved in normal propyl alcohol or in methylethylketone. Chemical A and chemical B were used to put two separate numerical marks on a black leather substrate. The marks numerical marks on a black leather substrate. The marks were dried and became totally invisible to the eye both when the marks were held under a normal light source and under an ultraviolet light source.

Each mark was highlighted with the other of a chemical B or A carrying vehicle and allowed to dry. Under visual examination with the help of an ordinary light source, neither marking could be seen on the leather substrate. When an ultraviolet light source was shined over the substrate, a very bright orange fluorescent glow was observed over the original marks and made them readable.

It will be understood by those persons skilled in this art that the present invention has been described hereinabove by way of example and by preferred embodiment and not as a limitation on the invention. It is to be realized that various changes, alterations, rearrangements and modifications can be made by those skilled in the art to which it relates without departing from the spirit and the scope of the present invention.

What is claimed is:

1. A security marking method comprising the steps of:

marking a portion of a substrate by applying a first marking fluid which upon drying is invisible to an unaided human eye when illuminated by visible light or ultraviolet light; and activating the marked portion by applying a second marking fluid thereon, wherein the second marking fluid is reactable with the first marking fluid to be invisible upon drying to an unaided human eye when illuminated by visible light, and only visible to an unaided human eye when illuminated by ultraviolet light and by applying a solvent to the first and second marking fluids on the substrate.

2. A security marking method comprising the steps of:

marking a portion of a substrate by applying a first marking fluid which upon drying is invisible to an unaided human eye when illuminated by visible light or ultraviolet light; and activating the marked portion by applying a second marking fluid thereon, wherein the second marking fluid is reactable with the first marking fluid to be invisible upon drying to an unaided human eye when illuminated by visible light, and only visible to an unaided human eye when illuminated by ultraviolet light and wherein the first marking fluid is selected from amino phthalides and quinazolines.

3. The method according to claim 2, wherein the second marking fluid is selected from novalac resins, bisphenols and hydroxybenzoates.

4. A security marking method comprising the steps of:

marking a portion of a substrate by applying a first marking fluid which upon drying is invisible to an unaided human eye when illuminated by visible light or ultraviolet light; and activating the marked portion by applying a second marking fluid thereon, wherein the second marking fluid is reactable with the first marking fluid to be invisible upon drying to an unaided human eye when illuminated by visible light, and only visible to an unaided human eye when illuminated by ultraviolet light and wherein the first marking fluid is selected from novalac resins, bisphenols and hydroxybenzoates.

5. The method according to claim 4, wherein the second marking fluid is selected from amino phthalides and quinazolines.

6. The method according to claim 1, wherein the first and second marking fluids are each applied in solvent vehicles.

7. The method according to claim 6, wherein the solvent is selected from alcohol, acetone, methylethylketone or a combination thereof.

8. A security marking method comprising the steps of:

marking a portion of a substrate by applying a first marking fluid which upon drying is invisible to an unaided human eye when illuminated by visible light or ultraviolet light; and activating the marked portion by applying a second marking fluid thereon, wherein the second marking fluid is reactable with the first marking fluid to be invisible upon drying to an unaided human eye when illuminated by visible light, and only visible to an unaided human eye when illuminated by ultraviolet light and wherein the first and second marking fluids are each applied as micronized particles in an aqueous solution with a binder and by applying a solvent to the applied first and second marking fluids on the substrate.

9. A security marking composition comprising:

a first marking fluid which upon drying is invisible to an unaided human eye when illuminated by visible light or ultraviolet light; and a second marking fluid thereon, wherein the second marking fluid is reactable with the first marking fluid to be invisible upon drying to an unaided human eye, when illuminated by visible light, and only visible to an unaided human eye when illuminated by ultraviolet light and wherein the first marking fluid is selected from amino phthalides and quinazolines.

10. The composition according to claim 9, further comprising a solvent.

11. The composition according to claim 9, wherein the second marking fluid is selected from novalac resins, bisphenols and hydroxybenzoates.

12. A security marking composition comprising:

a first marking fluid which upon drying is invisible to an unaided human eye when illuminated by visible light or ultraviolet light; and a second marking fluid thereon, wherein the second marking fluid is reactable with the first marking fluid to be invisible upon drying to an unaided human eye when illuminated by visible light, and only visible to an unaided human eye when illuminated by ultraviolet light and wherein the first marking fluid is selected from novalac resins, bisphenols and hydroxybenzoates.

13. The composition according to claim 12, wherein the second marking fluid is selected from amino phthalides and quinazolines.

14. The composition according to claim 9, wherein the first and second marking fluids are each applied in solvent vehicles.

15. The composition according to claim 14, wherein the solvent is selected from alcohol, acetone, methylethylketone or a combination thereof.

16. A security marking composition comprising:

a first marking fluid which upon drying is invisible to an unaided human eye when illuminated by visible light or ultraviolet light; and a second marking fluid thereon, wherein the second marking fluid is reactable with the first marking fluid to be invisible upon drying to an unaided human eye when illuminated by visible light, and only visible to an unaided human eye when illuminated by ultraviolet light and wherein the first and second marking fluids each comprise micronized particles in an aqueous solution with a binder and each are activated by a solvent.

* * * * *